United States Patent [19]

Fernando et al.

[11] Patent Number: 5,008,744
[45] Date of Patent: Apr. 16, 1991

[54] METHOD AND APPARATUS FOR PICTURE MOTION MEASUREMENT USING PICTURE CORRELATION AS A FUNCTION OF DISPLACEMENT

[75] Inventors: Gerard M. X. Fernando, Croydon, England; Aldo Giardina, Geneva, Switzerland

[73] Assignee: U.S. Philips Corporation, New York, N.Y.

[21] Appl. No.: 388,421

[22] Filed: Aug. 2, 1989

[30] Foreign Application Priority Data

Sep. 5, 1988 [GB] United Kingdom ............... 8820837

[51] Int. Cl.$^5$ .............................................. H04N 7/12
[52] U.S. Cl. .................................... 358/105; 358/140
[58] Field of Search ................ 358/105, 136, 140, 138

[56] References Cited

U.S. PATENT DOCUMENTS

| | | | |
|---|---|---|---|
| 4,661,846 | 4/1987 | Kondo | 358/105 |
| 4,777,530 | 10/1988 | Kondo | 358/105 |
| 4,853,775 | 8/1989 | Rouvrais et al. | 358/105 |

FOREIGN PATENT DOCUMENTS

| | | |
|---|---|---|
| 0294962 | 12/1988 | European Pat. Off. . |
| 2187059 | 8/1987 | United Kingdom . |
| 2188510 | 9/1987 | United Kingdom . |

OTHER PUBLICATIONS

"Television Motion Measurement for DATV and Other Applications", BBC Research Report; Thomas; Sep. '87.

*Primary Examiner*—Victor R. Kostak
*Attorney, Agent, or Firm*—Michael E. Marion

[57] ABSTRACT

A method of picture motion measurement in which two pictures are correlated to determine correlation as a function of displacement to determine peak correlation values corresponding to motion vectors. In the method a maximum sample point (P) associated with a peak in a correlation surface is located and a second sample point (D) of those immediately surrounding said point (P) selected having the steepest gradient with respect to the said point (P). The difference (d1) in magnitude between these points is determined as is the corresponding difference (d2) between the said point (P) and a point (H) colinear therewith. A comparison of these differences (d1 and d2) is used to determine the location of the peak to an accuracy better than the interval between adjacent sample points.

5 Claims, 3 Drawing Sheets

METHOD AND APPARATUS FOR PICTURE MOTION MEASUREMENT USING PICTURE CORRELATION AS A FUNCTION OF DISPLACEMENT

BACKGROUND OF THE INVENTION

The present invention relates to a method of picture motion measurement comprising correlating two pictures to determine correlation as a function of displacement thereby to determine one or more peak correlation values corresponding to respective motion vectors. The invention also relates to apparatus for use with the above method.

A method of the above type is described in U.K. Patent Application GB 2188510A which is particularly concerned with the generation of motion vectors for television pictures. In the field of High Definition Television (HDTV) such motion vectors are conveyed with a television signal and are used to produce at a receiver an enhanced display either by assisting in producing additional lines to those in the received signal or in producing additional fields between those in the received signal. Such motion vectors are produced as a result of the correlation between two pictures and in the case of a television signal it is preferable if their location can be identified to sub-pixel accuracy.

SUMMARY OF THE INVENTION

It is an object of the present invention to provide a method of the above type and apparatus in which the said location can be identified in a relatively simple manner.

The invention according to a first aspect provides a method of picture motion measurement comprising correlating two pictures to determine correlation as a function of displacement thereby to determine one or more peak correlation values corresponding to respective motion vectors, said method being characterized by the steps of:-
(i) locating a sample point of maximum correlation value in said correlation function associated with a peak correlation value,
(ii) determining from the sample points immediately surrounding said point of maximum value a second sample point which is associated with the steepest gradient between said surrounding and said maximum value sample points,
(iii) determining the difference (d1) in magnitude between that of said maximum sample point and that of said second sample point or other quantity proportional thereto,
(iv) determining the difference (d2) in magnitude between that of said maximum sample point and that of a third of said surrounding sample points which is colinear with said maximum and said second sample points but remote from said second sample point or other quantity proportional thereto, and
(v) comparing the results produced by steps (iii) and (iv) to determine the location of said peak correlation value associated with said sample point of maximum correlation value to an accuracy better than the interval between adjacent sample points.

Such a method has the advantage that it makes few very simple comparisons which replace the intensive mathematical operations required by previous methods.

The invention may be further characterized in that the sample points may be spaced one pixel apart, and that if said difference d2 or proportional quantity is greater than one half of the difference d1 or proportional quantity the said peak correlation value may be assumed to be coincident with the sample point of maximum correlation value whilst if the difference d2 or proportional quantity is less than the difference d1 or proportional quantity the peak correlation value may be assumed to be located on the said line halfway between the sample point of maximum correlation value and the third sample point. This gives the preferred sub-pixel accuracy.

Where the invention is used with television signals it may be characterized in that the two pictures may be adjacent frames from the television signal with each frame being subdivided into a plurality of regions, correlation taking place between corresponding regions of the adjacent frames.

The invention also provides apparatus for use with the above method. Apparatus for picture motion measurement according to a second aspect of the invention may be characterized in that it comprises means for providing from two pictures a sampled correlation function for determining correlation as a function of displacement which correlation surface contains at least one sample point of maximum correlation value, means for locating said sample point of maximum correlation value, means for examining sample points in said correlation function immediately surrounding said maximum sample point and for determining a second sample point which is associated with the steepest gradient between said surrounding and said maximum value sample points, means for determining the difference (d1) in magnitude between that of the maximum sample point and that of said second sample point or other quantity proportional thereto, means for determining the difference (d2) in magnitude between that of said maximum sample point and that of a third of said surrounding sample points which is colinear with said maximum and said second sample points but remote from said second sample point or other quantity proportional thereto, and means for comparing the two results so produced to determine the location of the peak correlation function in said correlation surface associated with said maximum sample point to an accuracy better than the interval between adjacent sample points.

BRIEF DESCRIPTION OF THE DRAWINGS

The above and other features of the invention will be described by way of example with reference to the accompanying drawings in which.

DETAILED DESCRIPTION OF THE INVENTION

Figure 1:
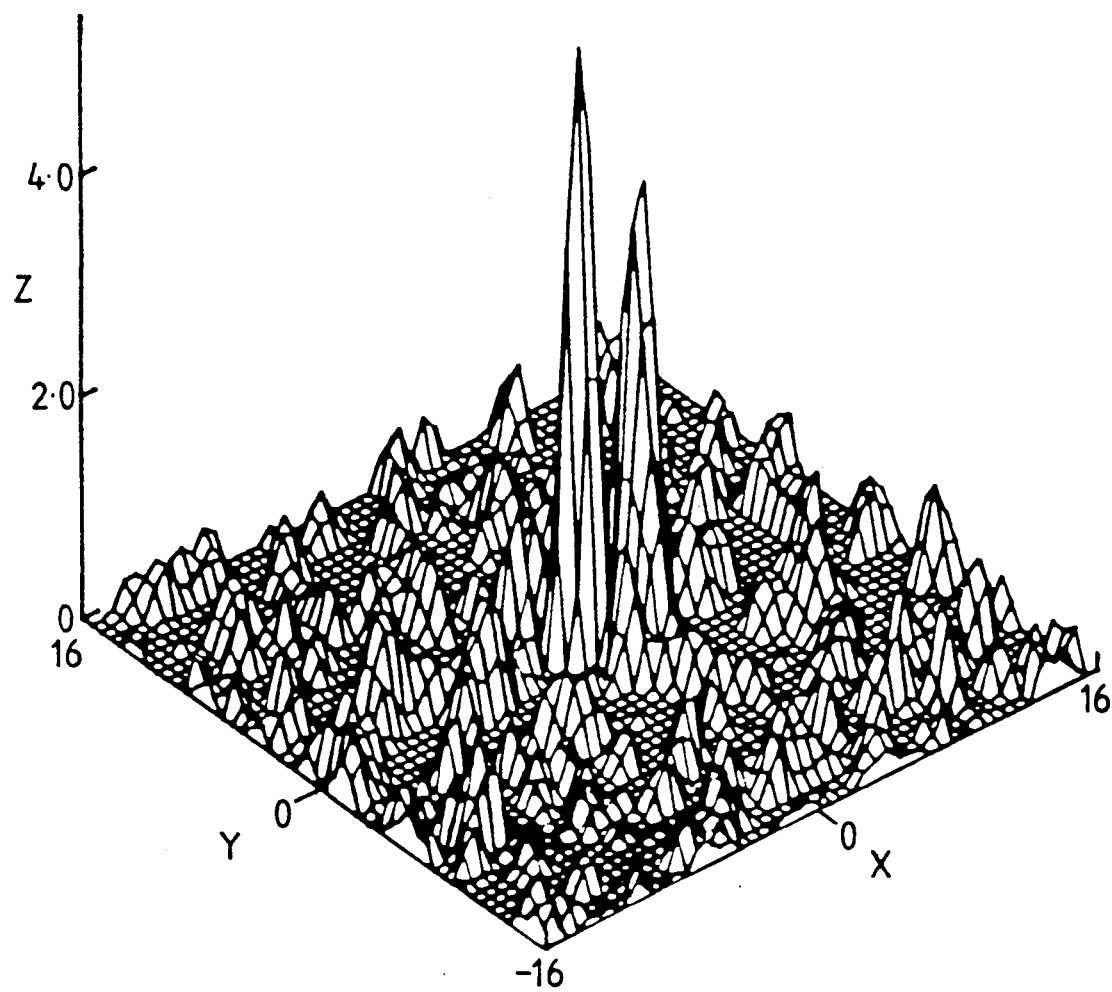
FIG. 1 is a correlation surface of the same region from adjacent frames of a television picture.

FIG. 1 shows a correlation surface obtained by correlating the same region in two adjacent television frames. It is assumed that each region is 32 pixels × 32 lines and thus the displacement in the X and Y directions of FIG. 1 run from −16 to +16 sample positions with each sample being one pixel apart. In practice FIG. 1 would not appear as a continuous correlation surface but as a series of discrete samples of given magnitudes spaced one pixel apart. The correlation surface may be achieved by means of phase correlation as described in the above U.K. Patent Application or in the article "Video-rate Image Correlation Processor" by J. J. Pearson, D. C. Hines Jr., S Golosman and C. D. Kuglin, SPIE Vol. 119, Applications of Digital Image Processing (IOCC 1977) or by any other suitable method such as optimal matching of the corresponding regions. Zero displacement represents lack of movement and the peaks located away from the zero displacement position indicate varying degrees of movement of components within the region. Although the samples are provided at intervals of one pixel apart it is preferable if the positions of the actual peaks can be determined to sub-pixel accuracy. How this can be achieved is described in relation to FIG. 2.

Figure 2:
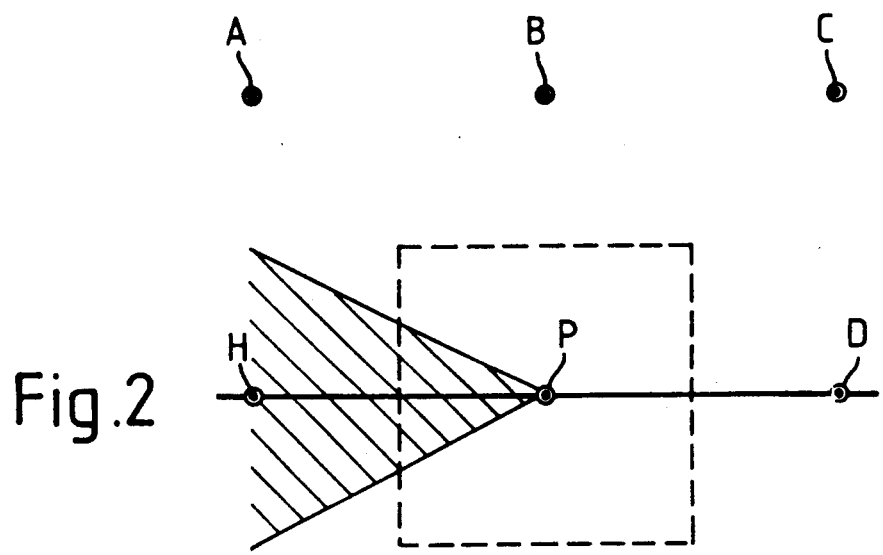
FIG. 2 is a plan view of a portion of FIG. 1, FIGS. 3 and 4 are each a section through FIG. 2
Figure 3:
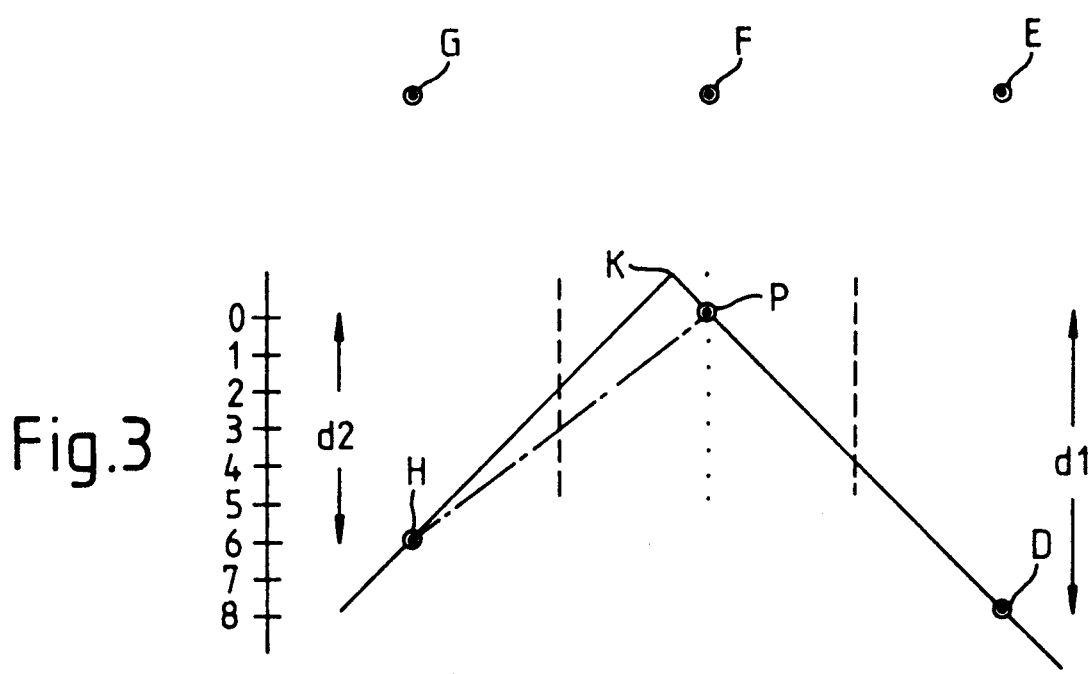
Figure 4:
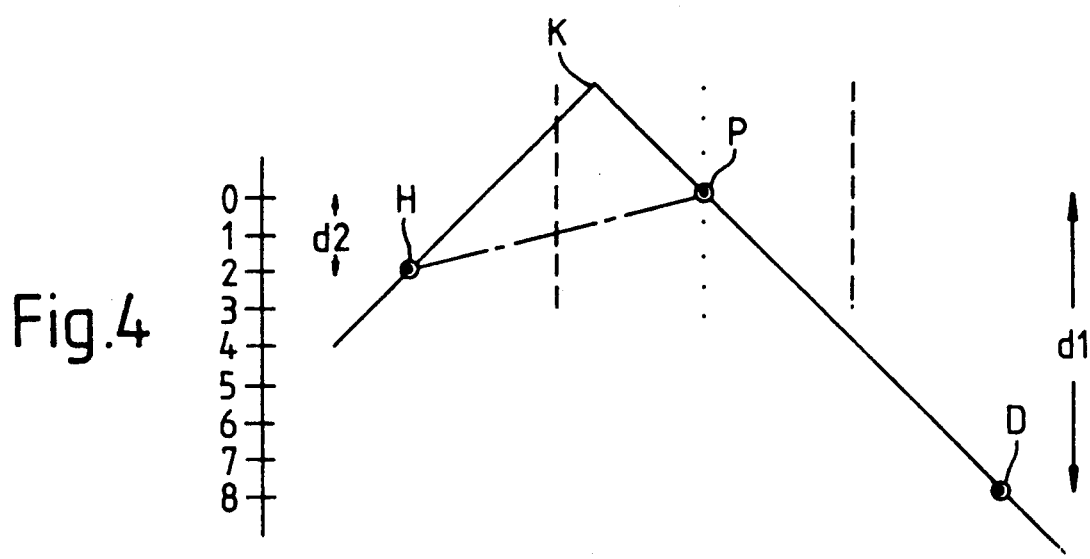

As previously stated in relation to FIG. 1, the correlation surface actually produces a series of discrete samples at points one pixel apart. Thus a peak may not coincide with a localized sample of greatest magnitude. In order to define more accurately the coordinates of a peak the correlation surface is first of all examined to determine a point with the sample of greatest magnitude. This is shown in FIG. 2 as the point P which figure is a plan view of a portion of the correlation surface. Having found sample point P the eight sample points A to H one pixel apart surrounding point P are considered and the relative gradients of lines joining point P with each of the surrounding points A to H are found. The surrounding point through which the line of steepest gradient passes is selected and its magnitude established. It is assumed that this sample point is point D. From this it will be appreciated that the peak associated with the sample P must be located within the cross-hatched triangle having its apex at point P and additionally within the broken line square where respective sides are located at a distance of a half pixel interval from points B, D, F and H. Two locations for the actual peak are illustrated in FIGS. 3 and 4 which are sectional views of the part of the correlation surface taken along a plane passing through sample points H, P and D. In FIG. 3 the peak K is located closer to the coordinates of the sample point P whilst in FIG. 4 peak K is located closer to the coordinates of the half pixel interval than to that of sample point P. The difference d1 in magnitude between that of the sample at point P and that of the sample at point D is then determined. The sample on a straight or direct line from point D to beyond point P is then considered, which in this case is point H, and the difference d2 between the magnitude of the sample at this point and that at point P determined. Differences d1 and d2 are then compared. It has been found that if d2 is greater than one half of d1 then the peak K is located close to the coordinates for sample point P whilst if d2 is less than one half of d1 the peak is located closer to the half sample interval coordinate than to that for point P. This can be more readily seen from FIGS. 3 and 4.

In FIGS. 3 and 4 a scale of units is provided on the left hand side of each figure. From FIG. 3 it will be seen that difference d1 has 8 units whilst difference d2 has 6 units. Thus d2 is greater than 0.5 d1 and in conformity with the above the peak K is located adjacent sample point P. Working to half pixel accuracy the appropriate coordinates would be that of sample point P. In FIG. 4 the difference d1 is again 8 units but the difference d2 is reduced to 2 units in which case d2 is less than 0.5 d1. This conforms with the above in that the peak K is located closer to the half pixel interval (broken line) between sample points P and H than to sample point P itself. Thus when working to half pixel accuracy the appropriate coordinates for the peak K in the case of FIG. 4 would be that for the broken line between sample points P and H.

In the above the description is concerned with locating the sample point of maximum magnitude for the purpose of locating the major peak in a correlation surface for a given region. This process will then be repeated for other (lesser) peaks in the correlation surface by locating local sample points of maximum amplitude associated with such peaks.

Figure 5:
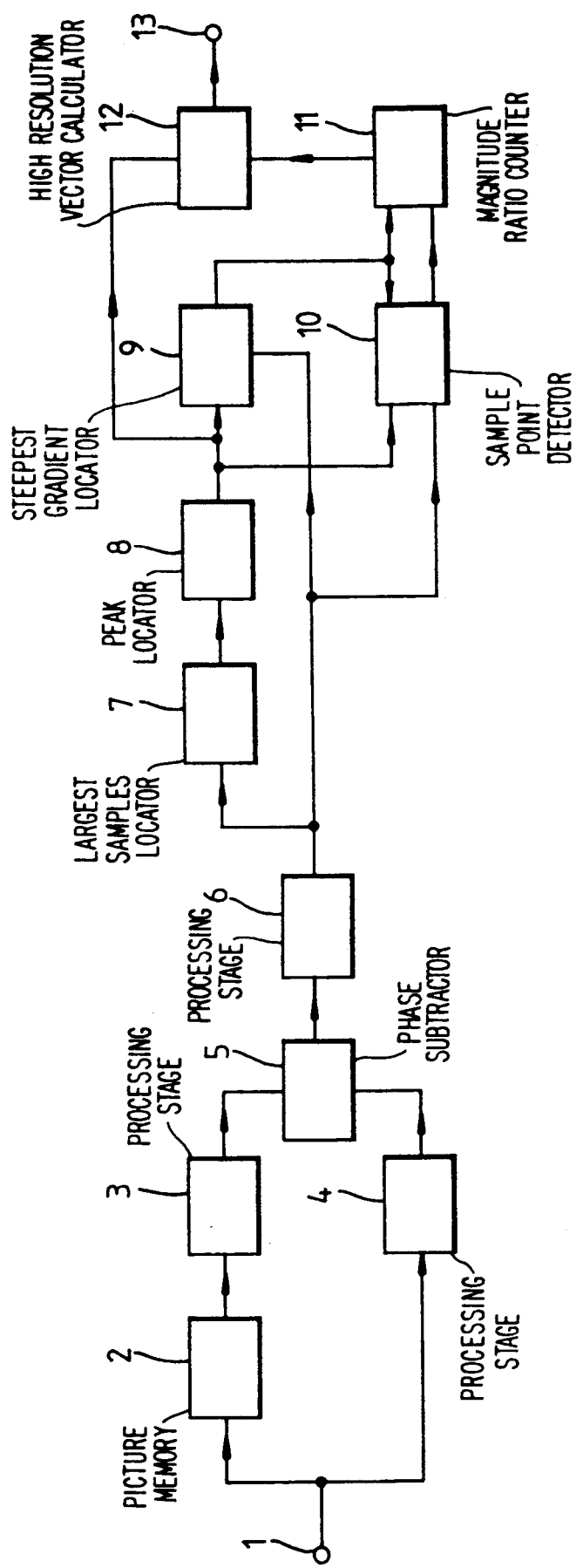
FIG. 5 is a block diagram of apparatus for use with the invention.

FIG. 5 shows a block diagram of apparatus for performing the method described above. Such apparatus would in general be located with the signal processing equipment at the transmission side in the case of television signals but it is also possible, though less economic, for such apparatus to be located in television receiving apparatus. In FIG. 5 the reference 1 indicates an input terminal to which a luminance signal is applied either frame by frame or region by region. This luminance signal is applied to a picture memory 2 in which the luminance signal is delayed by a frame period which delayed luminance output is applied to a processing stage 3 where it is subjected to a two dimensional Fourier transform. The luminance signal at input terminal 1 is also applied directly to a second processing stage 4 in which the undelayed luminance is similarly subjected to a two dimensional Fourier transform. The resulting transformed information is applied to a phase subtractor 5 which establishes the difference in phase between its two inputs and applies this to a third processing stage 6 whose output is the inverse Fourier transform. This output is the correlation function as illustrated by the typical correlation surface as shown in FIG. 1 though in discrete correlation sample form as described above in relation to that figure.

The correlation samples from processor stage 6 are applied to a largest samples locator 7 which provides the location or locations for one or more sample points having a magnitude above a certain value. These locations are applied to a peak locator 8 which looks for samples of maximum magnitude associated with different peaks. One such sample may be that represented by P in FIG. 2. The location of the sample P under investigation is applied to a steepest gradient locator 9 together with the correlation samples from processor stage 6 and each of the eight samples surrounding that at point P are examined to determine which of the gradients from these sample points to point P is the steepest. As in the case of FIG. 2 it will be assumed that this steepest gradient passes through sample point D and the output of steepest gradient selector 9 will identify this point and the difference (d1) in magnitude between the samples at points P and D. The output of the peak locator 8 and the correlation samples from processor stage 6 are also applied to an opposite sample point selector 10 which also receives the identity of the sample point selected by the steepest gradient locator 9. The selector 10 selects the sample point colinear with points P and D but remote from point D (in the case of FIG. 2 this is sample point H) and provides at its output the difference (d2) in magnitude between the samples at points P and H. This together with the similar information regarding difference d1 is applied to a magnitude ratio counter 11 which makes the comparisons described above to determine whether difference d2 is greater or less than 0.5 d1.

The results of this comparison which is an indication of the real peak position is applied to a high resolution vector calculator 12 which also receives the location of the sample P under investigation from peak locator 8. Calculator 12 calculates to sub-pixel accuracy the motion vector for the peak associated with sample point P from the information supplied, the higher resolution motion vector being present at an output 13. The process is repeated for other peaks in the picture or region.

In a modification of the apparatus described in relation to FIG. 5 and the method previously described the opposite sample point detector 10 and the magnitude ratio counter 11 may be replaced respectively by an opposite gradient locator and a gradient ratio calculator. The opposite gradient locator will then determine the gradient between the opposite sample point H and the maximum sample point P and the gradient ratio calculator will then compare the gradient for the points H-P with that for the points D-P which will be derived from the steepest gradient locator 9. If the gradient for points H-P is greater than half the gradient for points D-P then the actual peak will be located closer to sample point P than to the half pixel point. However if the gradient for points H-P is less than half the gradient for points D-P then the actual peak will be located closer to the half pixel point than to the sample point P. This can be seen from the chain link lines in FIGS. 3 and 4. It will be appreciated that these respective gradients are proportional to the magnitude differences d1 and d2.

Although in the above the method is described as being carried out by apparatus units which have specified functions it will be realized that the method may be performed by a microcomputer under dedicated software control.

From reading the present disclosure, other modifications will be apparent to persons skilled in the art. Such modifications may involve other features which are already known in the design, manufacture and use of the method and apparatus and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A method of picture motion measurement comprising correlating two pictures to determine correlation as a function of displacement thereby to determine one or more peak correlation values corresponding to respective motion vectors, said method being characterized by the steps of:-
   (i) locating a sample point of maximum correlation value in said correlation function associated with a peak correlation value,
   (ii) determining from the sample points immediately surrounding said point of maximum value a second sample point which is associated with the steepest gradient between said surrounding and said maximum value sample points,
   (iii) determining the difference (d1) in magnitude between that of said maximum sample point and that of said second sample point, or other quantity proportional thereto,
   (iv) determining the difference (d2) in magnitude between that of said maximum sample point and that of a third of said surrounding sample points which is colinear with said maximum and said second sample point but remote from said second sample point or other quantity proportional thereto, and
   (v) comparing the results produced by steps (iii) and (iv) to determine the location of said peak correlation value associated with said sample point of maximum correlation value to an accuracy better than the interval between adjacent sample points.

2. A method as claimed in claim 1, wherein said sample points are spaced one pixel apart, and that if said difference d2 or a proportional quantity is greater than one half of the difference d1 or proportional quantity the said peak correlation value is assumed to coincide with the sample point of maximum correlation value while if the difference d2 or proportional quantity is less than one half of the difference d1 or proportional quantity the said peak correlation value is assumed to be located on the said line halfway between the sample point of maximum correlation value and said third sample point.

3. A method as claimed in claim 2, wherein said two pictures are adjacent frames of a television signal with each frame being subdivided into a plurality of regions, correlation taking place between corresponding regions of the said adjacent frames.

4. A method as claimed in claim 1, wherein said two pictures are adjacent frames of a television signal with each frame being subdivided into a plurality of regions, correlation taking place between corresponding regions of the said adjacent frames.

5. Apparatus for picture motion measurement, characterized in that said apparatus comprises means for providing from two pictures a sampled correlation surface for determining correlation as a function of displacement which correlation function contains at Least one sample point of maximum correlation value, means for locating said sample point of maximum correlation value, means for examining sample points in said correlation function immediately surrounding said maximum sample point and for a second sample point which is associated with the steepest gradient between determining said surrounding and said maximum value sample points, means for determining the difference (d1) in magnitude between that of the maximum sample point and that of said second sample point or other quantity proportional thereto, means for determining the difference (d2) in magnitude between that of said maximum sample point and that of a third of said surrounding sample points which is colinear with said maximum and said second sample points but remote from said second sample point or other quantity proportional thereto, and means for comparing the two results so produced to determine the location of the peak correlation value in said correlation function associated with said maximum sample point to an accuracy better than the interval between adjacent sample points.

* * * * *